Oct. 19, 1937.   G. W. TOWNE   2,096,268
MACHINE FOR MAKING CORRUGATED FASTENERS
Filed July 10, 1936   2 Sheets-Sheet 1
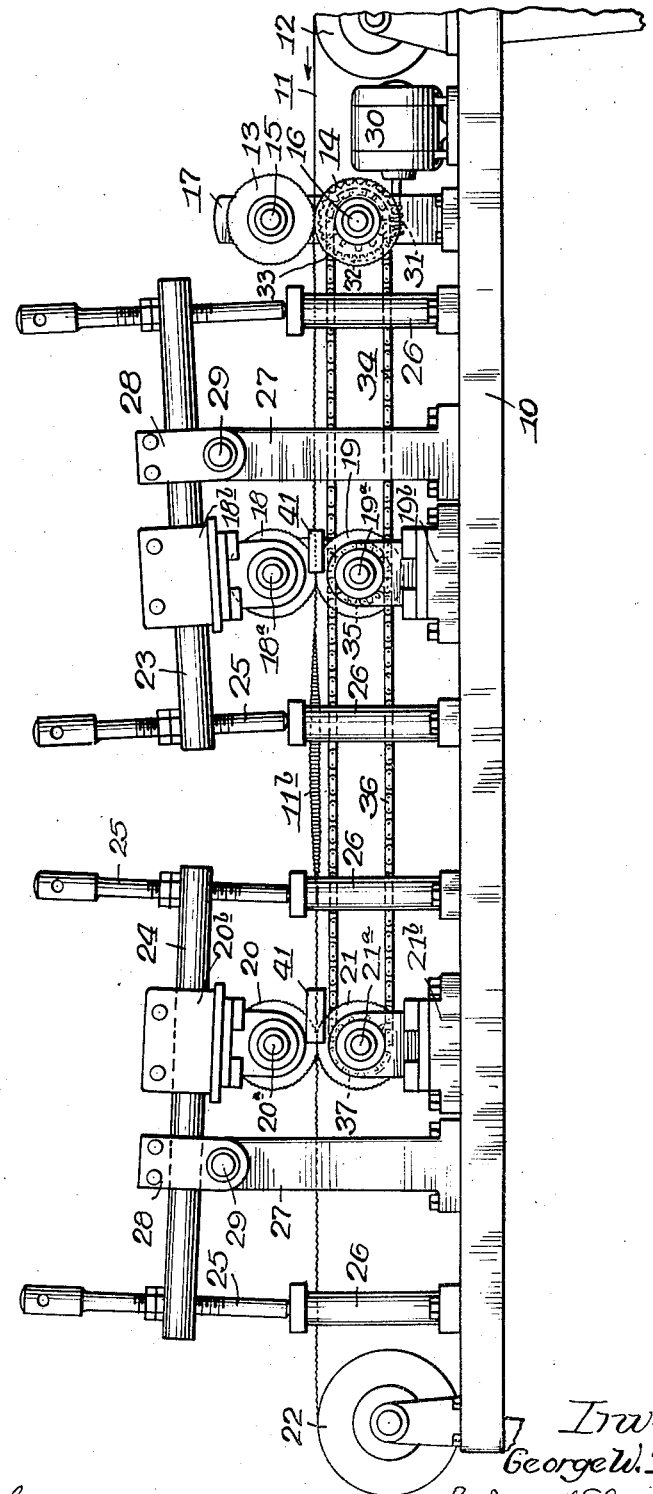
Inventor
George W. Towne,
By Maxwell F. Cargill Atty.
Witness:

Oct. 19, 1937.  G. W. TOWNE  2,096,268
MACHINE FOR MAKING CORRUGATED FASTENERS
Filed July 10, 1936  2 Sheets-Sheet 2
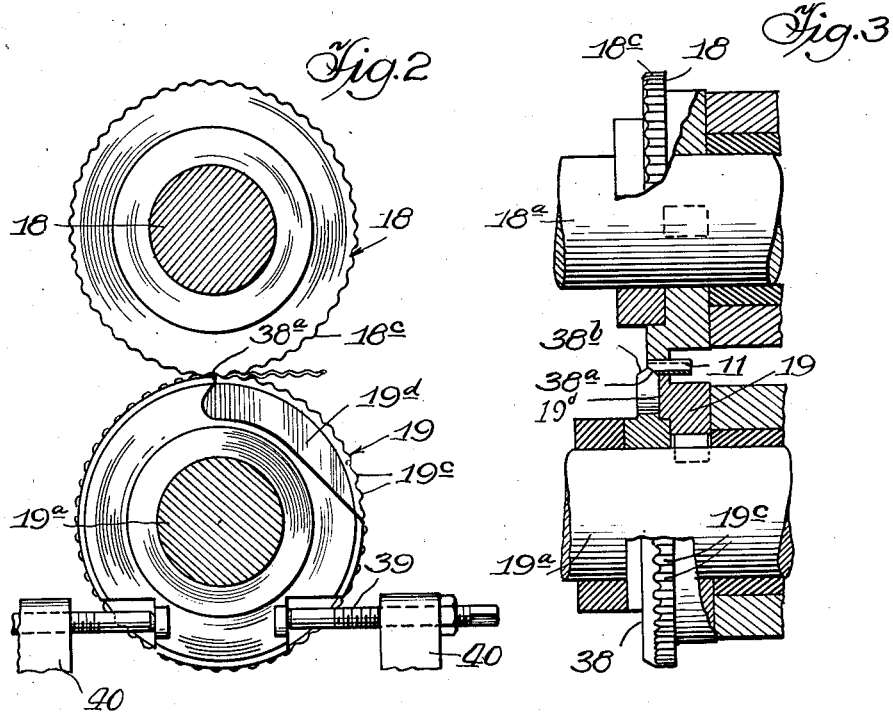
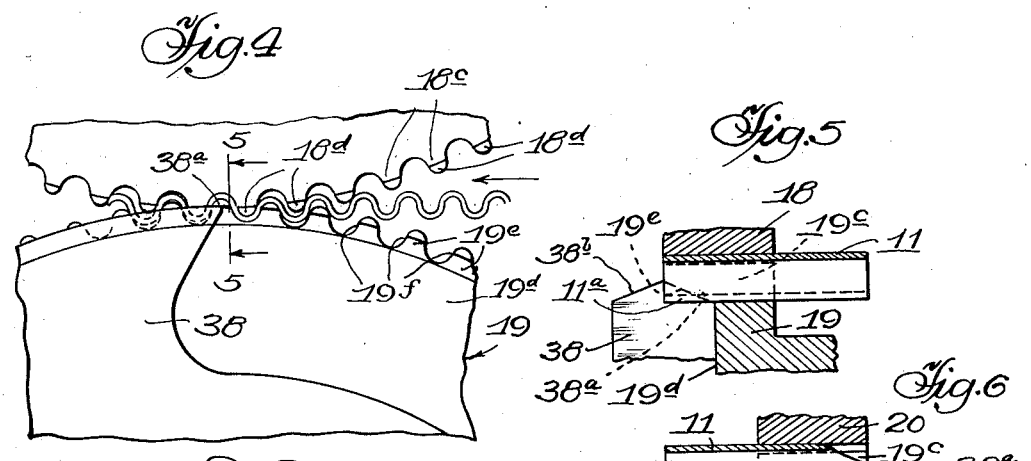
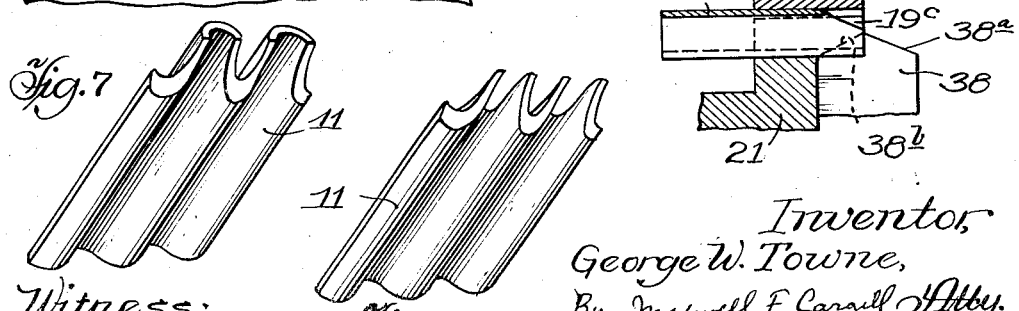
Inventor,
George W. Towne,
By Maxwell F. Cargill Atty.

Patented Oct. 19, 1937

2,096,268

UNITED STATES PATENT OFFICE 2,096,268

MACHINE FOR MAKING CORRUGATED FASTENERS

George W. Towne, Danville, Ill., assignor, by mesne assignments, to Acme Steel Company, Chicago, Ill., a corporation of Illinois Application July 10, 1936, Serial No. 90,025

14 Claims. (Cl. 164—39)

This invention relates to machines for making corrugated fasteners.

The principal object of the invention is to provide improved mechanism for forming teeth along the penetrating edge of a corrugated steel ribbon or strip, which may subsequently be cut into fasteners of the desired length or left in coil form for use in corrugated fastener driving machines.

In the manufacture of corrugated fasteners, various means have heretofore been employed for beveling an edge of a corrugated strip to form teeth at the penetrating end or edge of the fasteners, such as grinding wheels, milling cutters and rotary knives, for example. One difficulty encountered in the manufacture of fasteners has been in the elimination of burrs at the edges of the teeth which must be removed by a subsequent operation where the best driving characteristics are to be attained. In using the present improvements a corrugated strip is moved uninterruptedly between coacting toothed rolls and against a stationary teeth-forming cutter which bevel shears the ends of each successive corrugation while the corrugations are being firmly supported by the rolls, the shearing action providing sharp, burr-free teeth.

Another object of the invention is to provide feeding or supporting rolls for a corrugated strip, which have teeth which coact with a cutter to provide a shearing action for bevel shearing the ends of successive corrugations of the strip as the corrugations are firmly supported momentarily both interiorly and exteriorly by the meshing teeth of the rolls during the uninterrupted passage of the strip between the same.

Other objects and advantages of the present improvements will be apparent from a consideration of the following specification and accompanying drawings, wherein:

Figure 1 is a side elevation illustrating a corrugated fastener making machine embodying the present improvements.

Figure 2 is a detached end elevation of one pair of tooth forming rolls and associated cutter, certain parts being shown in section.

Figure 3 is a side elevation of the two rolls shown in Figure 2, certain parts being shown broken away for the purpose of clarity.

Figure 4 is an enlarged broken end elevation of the two rolls illustrated in Figure 2.

Figure 5 is an enlarged broken section taken on line 5—5 of Figure 4.

Figure 6 is a similar view of a second set of rolls.

Figure 7 is a perspective view of a section of fastener strip having partially formed saw teeth as they appear after the strip has passed through the first set of rolls, shown in Figures 2 to 5 inclusive.

Figure 8 illustrates a section of fastener strip having fully formed teeth as they appear after the strip has passed through the second set of rolls.

In Figure 1 of the drawings, 10 indicates a bed or supporting frame which supports the corrugating and teeth forming mechanism. A flat metal strip or ribbon 11 of the proper gauge and width may be supplied by a reel 12, the strip passing between conventional upper and lower corrugating rolls 13 and 14 mounted on shafts 15 and 16 respectively which may be journaled in any suitable support 17 which is shown as mounted on the bed 10. The rolls 13 and 14 form corrugations in the strip which then passes between the first pair of tooth forming or serrating rolls 18 and 19 and thence between a second pair of similar rolls 20 and 21 which complete the formation of saw teeth, whence the strip may go to a wind-up reel 22 or to a machine of well known form which cuts the strip into individual fasteners of the desired length.

The two lower tooth form rolls 19 and 21 are keyed to shafts 19a, 21a, respectively, by means of which they are driven, the shafts being mounted in suitable bearings 19b, 21b which are secured to the bed 10. The upper rolls 18 and 20 are mounted on shafts 18a, 20a, which are mounted in bearings 18b, 20b, which may be supported by any suitable structure adapted to retain the upper rolls in proper position with respect to their companion lower rolls.

The supporting structure illustrated in Figure 1 for the upper rolls 18 and 20 comprises steel rods 23 and 24 to which the respective bearings 18b and 20b are adjustably clamped.

The ends of each of the rods 23, 24 are supported by threaded adjusting screws 25 which are supported by standards 26 which are attached to the bed 10. To add additional support for the rods and prevent vibration are intermediate standards 27 to which members 28 are pivotally connected at 29, which resist vibration and deflection of the rods 23, 24, but permit vertical adjustment of the rolls 18, 20, with reference to the companion rolls 19, 21, respectively.

The corrugating rolls and tooth forming rolls may be driven in synchronism by any suitable means, such as by a motor 30 which through a worm 31 drives a gear 32 mounted on the shaft 16 of the lower corrugating roll, on which shaft is also mounted a sprocket 33 over which passes a chain 34 to a sprocket 35 mounted on shaft 19a. A similar sprocket on the shaft 19a operates a chain 36 which drives the shaft 21a by means of a sprocket 37. By this arrangement the strip 11 passes through the corrugating rolls and the teeth forming rolls at the same linear velocity.

The two pairs of teeth forming rolls 18, 19, and 20, 21, are structurally similar in all respects, the only difference between them being the opposite arrangement of the same on their respective shafts to form the teeth on the strip by bevel-shearing the ends of the corrugations from one side of the strip by one set of rolls and then bevel shearing the remaining corresponding ends by the second set of rolls as will be described more specifically hereinafter. The rolls illustrated in Figures 2 to 5 are rolls 18 and 19 and as shown in said figures are provided with teeth 18c, 19c, of a size and shape to firmly mesh with the corrugations formed in the strip by the corrugating rolls 13, 14.

The teeth 19c of the lower roll 19, as illustrated in Figures 3 and 5, extend beyond one face 19d of the roll, the inner faces 19e of the projecting portions of teeth being beveled from the base or root of the tooth on an angle corresponding to the desired angle of the teeth of the fasteners.

Mounted on the shaft 19a adjacent the face 19d of the roll 19 is a cutter 38 illustrated as of disc shape and positioned on the shaft 19a. The cutter does not rotate on the shaft but is held stationary by threaded adjusting studs 39 which, as shown in Figure 2, may be mounted in blocks 40 secured to the bed 10 or other stationary portion of the apparatus. The studs 39 can be adjusted to locate the shearing or cutting edge 38a of the cutter substantially in the vertical plane of the axes of the rolls 18, 19, as shown in Figure 2.

The shearing edge 38a of the cutter, as shown in Figure 5, is shaped to fit in shearing relation with the faces 19e of the projecting portions of the teeth 19.

As shown in Figures 4 and 5, it will be seen that the ends of the lower convolutions of the corrugations of the strip 11 will, due to the bevel of the faces 19e of the projecting ends of the teeth 19c, project below said faces as the corrugations approach the cutting edge 38a of the cutter and at this point the teeth of the coacting rolls are in full meshing relation with the corrugations of the strip, thus supporting each corrugation both internally (that is on the concave surface thereof) and externally (on the convex surface) during the shearing operation. As the corrugations move against the cutting edge 38a, these exposed lower projecting portions 11a (see Fig. 5) are sheared off due to the coaction of the edge 38a with the ends of the teeth 18c of roll 18 which support the corrugations internally along the line of severance and with the advancing or leading edges 19f of the projecting portions of the teeth 19c which support the corrugations externally.

It will be noted that the forward ends of the teeth 18c of the roll 18 are beveled at 18d (see Fig. 4), so that in shearing position they come substantially flush with the plane of the faces 19e to support the end of the corrugations and coact with the cutter in the shearing operation. The strip is thus bevel-sheared as illustrated in Figure 7, after passing through the first set of rolls 18 and 19.

It will be obvious that the second set of rolls 20 and 21 could be arranged with the shearing roll uppermost to bevel-shear the opposite sides of the ends of the corrugations to complete the formation of the teeth. However, with such arrangement there would be some likelihood that the V-shaped chips from the first beveling operation would be carried by the corrugations of the strip between the second rolls. To avoid such imperfections in the second serrating operation as would likely be caused by metal chips passing between the rolls, it is preferred to provide a 180° twist in the strip, as illustrated at 11b in Figure 1, to discharge therefrom any chips that may lodge on the traveling strip. With this arrangement the lower roll 21 of the second set will correspond to lower roll 19 of the first set except that it is mounted on the shaft with the projecting ends of teeth extending in a direction opposite the teeth of the roll 19. The twist in the strip of course, is effected prior to passing the end thereof initially between the second set of rolls which are spaced sufficiently apart to avoid deformation of the strip.

In Figure 5 the strip 11 is shown in shearing position between the rolls 18 and 19 while in Figure 6 the strip is shown in similar position between the oppositely facing rolls 20, 21 which completes the formation of the teeth or serration in the corrugated strip as above described.

The cutter 38, as illustrated in Figure 5, is provided with two shearing edges 38a, 38b, the former of which functions when it is employed with the first set of rolls and the latter when it or a similar cutter is employed with the second set. Thus the cutters can be changed from one set of rolls to the other if desired to place the unused edges thereof in operation. The cutters can readily be sharpened, however, and as the cutting edge recedes to the left, as viewed in Figure 2, due to sharpening or use, the edge can be restored to the position shown in said figure by means of the adjusting studs 39.

In mounting the cutters 38 non-rotatably on the shaft 19a, 21a, in close contact with the faces of the respective rolls 19 and 21, suitable thrust bearings (not shown) are employed.

When the motor 30 is operated, the corrugating rolls and both sets of serrating or shearing rolls are operated at the same peripheral velocity by any suitable means, as by the sprocket and chain means above described. The strip is fed positively by the inter-meshing of the teeth of the rolls with the corrugations of the strip to bevel-shear the edge to form sharp pointed saw-like teeth at the penetrating edge of the fastener.

Adjustable guides 41 through which the strip passes, are positioned adjacent each set of rolls to aline the strip with the respective rolls and retain the edge to be serrated flush with the ends of the projecting ends of the teeth 19c, as illustrated in Figure 5, to assure the intersection of the beveled teeth forming surfaces in the median plane of the fasteners.

It will be apparent to those skilled in the art that tack pointed teeth will be provided by the machine if the strip has been previously beveled at the edge to be serrated.

While I have shown a machine which first bevels the opposite sides of one edge of the strip by similar but subsequent operations, I do not wish to be restricted to such arrangement or to other details of construction except as so limited by the appended claims.

I claim:
1. A corrugated fastener forming machine com- prising a pair of coacting toothed rolls adapted to mesh with and support momentarily successive corrugations of a corrugated strip passed between the same, the ends of the teeth of one roll having shear edges, and a cutter adjacent said rolls arranged to coact with said shear edges of said teeth for bevel shearing the ends of corrugations simultaneously with the momentary support of the corrugations by said rolls.

2. A corrugated fastener forming machine comprising a pair of coacting toothed rolls adapted to mesh with successive corrugations of a corrugated strip passed between the same, the ends of the teeth of one roll projecting beyond a face of the roll and provided with inclined shear edges, and a stationary cutter having an edge cooperating with the shear edges of the successive teeth to bevel-shear the ends of corrugations of the strip concurrently with the momentary meshing engagement of the corrugations with the teeth of said rolls.

3. A corrugated fastener forming machine comprising a pair of coacting toothed rolls adapted to mesh with successive corrugations of a corrugated strip passed between the same, the ends of one of said rolls being beveled outwardly from the base thereof to provide shear edges, and a stationary cutter having an edge positioned for shearing coacting with the edges of successive teeth for severing portions of the corrugations of the strip projecting laterally of said beveled ends as the corrugations move into full meshing relation with the successive teeth of said rolls.

4. A corrugated fastener forming machine comprising a pair of toothed rolls arranged to mesh with opposite faces of and support a corrugated strip moved between the rolls in the direction of its length, the ends of the teeth of one of said rolls projecting beyond one face of the roll and beveled on the inner surfaces thereof, and a cutter having a cutting edge located in shearing position with respect to the beveled ends of said teeth and cooperating therewith for bevel-shearing the ends of successive corrugations of the strip passing between said rolls.

5. A corrugated fastener forming machine comprising a pair of toothed rolls arranged to mesh with the corrugations of a corrugated strip traveling between said rolls in the direction of its length, the teeth of one of said rolls projecting axially beyond a face of the roll and having the inner surfaces of said ends beveled to provide advancing shear edges and a stationary cutter having a cutting edge located in shearing position with respect to said shearing edges for bevel-shearing the ends of the aligned portions of the corrugations as the same move successively into and from full meshing relation with said rolls.

6. A corrugated fastener forming machine comprising a pair of toothed rolls adapted to mesh with and support the successive corrugations of the strip as the same moves uninterruptedly between the rolls in the direction of its length, means for bevel-shearing the ends of successive corrugations on one side of the medial plane of the strip as the same pass between and are supported by said rolls, a second pair of similar toothed rolls between which said strip passes, and means for bevel-shearing the corresponding ends of the corrugations on the opposite side of the medial plane of the strip as the corrugations pass between said second pair of rolls.

7. A corrugated fastener forming machine comprising a pair of toothed rolls adapted to mesh with and support the successive corrugations of the strip as the same moves uninterruptedly between the rolls in the direction of its length, means for bevel-shearing the ends of successive corrugations on one side of the medial plane of the strip as the same pass between and are supported by said rolls, a second pair of similar toothed rolls between which said strip passes, and means for bevel-shearing the corresponding ends of the corrugations on the opposite side of the medial plane of the strip as the corrugations pass between said second pair of rolls, each of said means comprising shear edges on ends of the teeth of one of said rolls and a stationary cutter having a shear edge cooperating with said edges of said teeth.

8. In a corrugated fastener forming machine, teeth forming mechanism comprising a pair of coacting toothed rolls adapted to mesh with successive corrugations of a corrugated strip passed between the same, the ends of the teeth of one roll having shear edges, a stationary cutter having a shear edge positioned within the periphery of said teeth and arranged to coact with the successive edges of said teeth for bevel shearing the ends of corrugations on one side of the medial plane of the fastener as said corrugations move into meshing position with respect to said rolls, and similar tooth forming mechanism for bevel-shearing the corresponding ends of the corrugations on the opposite side of the medial plane of the strip.

9. Mechanism for cutting teeth on an edge of a corrugated strip comprising a toothed roll adapted to mesh with the corrugations of a corrugated strip moving in the direction of its length, the teeth of said roll having ends beveled outwardly from the base of the teeth to provide a shear edge on the advancing side of each tooth, a stationary cutter having a shear edge positioned in shearing relation with said shear edges of the teeth ends for bevel-shearing the ends of corrugations of the strip as the same moves into full meshing engagement with said roll, and means coacting with said roll for retaining the successive corrugations of the strip into full meshing engagement with the roll during the bevel shearing of the ends thereof.

10. Means for forming teeth on a longitudinal edge of a corrugated strip comprising two pairs of rolls between which the strip passes, the rolls of each pair having teeth arranged to mesh with the successive corrugations to support the same momentarily both interiorly and exteriorly as the corrugations pass between the rolls, and a cutter cooperating with the teeth of each pair of rolls, one cutter bevel shearing successive corrugations on one side of the medial plane of the strip during the momentary support of the corrugations by one pair of rolls and the other cutter bevel shearing the successive corrugations on the opposite side of said plane to complete the formation of the teeth as the corrugations are supported momentarily by the other pair of rolls.

11. Means for forming teeth in a longitudinal edge of a corrugated strip comprising a toothed roll arranged to mesh with the corrugations of a moving corrugated strip, the ends of the teeth of said roll being beveled to provide shear edges and to expose end portions of the corrugations as the successive corrugations move into full meshing position with the successive teeth of the roll, and a cutter arranged to cooperate with said shear edges to sever said exposed portions of the corrugations.

12. A corrugated fastener forming machine comprising a toothed roll arranged to mesh with corrugations of a corrugated strip moving in the direction of its length, the ends of the teeth of said roll projecting beyond a face of the roll and being shaped on the inner surfaces to provide shear edges and to expose end portions of the successive corrugations as the same move into meshing relation with the successive teeth of the roll, and a cutter having a cutting edge located within the inner periphery of said projecting ends and cooperating with the shear edges to sever successively said exposed portions of the corrugations.

13. In a machine for forming teeth along the longitudinal edge of a transversely corrugated strip, the combination of a pair of clamps for gripping opposite sides of the strip, one of the clamps having a shearing edge and the other clamp being located to expose portions of the corrugations along the longitudinal edge of the strip, and a cutter having a shearing edge for coacting with the other shearing edge to sever the exposed corrugated portions, one of the edges being movable relative to the other.

14. In a machine for forming teeth along the longitudinal edge of a transversely corrugated strip, a pair of clamps for gripping opposite sides of the strip and movable to shift the strip along a definite path, one of the clamps having a shearing edge and the other clamp being located to expose portions of the corrugations along the longitudinal edge of the strip, and a stationary cutter having a shearing edge for coacting with the movable shearing edge to successively sever the exposed corrugated portions during movement of the strip.

GEORGE W. TOWNE.